US007706297B1

United States Patent
Venkatraman

(10) Patent No.: US 7,706,297 B1
(45) Date of Patent: Apr. 27, 2010

(54) SYSTEM AND METHOD FOR PROVIDING REAL TIME SIGNAL TO NOISE COMPUTATION FOR A 100MB ETHERNET PHYSICAL LAYER DEVICE

(75) Inventor: Vivek Venkatraman, Irvine, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 1009 days.

(21) Appl. No.: 11/437,549

(22) Filed: May 19, 2006

(51) Int. Cl.
    *H04J 3/14* (2006.01)
(52) U.S. Cl. ........................................ 370/252; 375/227
(58) Field of Classification Search .................. 370/241, 370/241.1, 242, 243, 244, 245, 246, 249, 370/250, 252, 493, 406; 375/222, 227, 226, 375/261, 278, 285, 347; 702/57, 94, 111, 702/189; 455/67.13; 179/93.1; 716/1, 4; 703/1, 13; 700/262
    See application file for complete search history.

(56) References Cited

U.S. PATENT DOCUMENTS

| | | | |
|---|---|---|---|
| 6,173,258 B1 * | 1/2001 | Menendez-Pidal et al. ... | 704/233 |
| 6,597,660 B1 * | 7/2003 | Rueda et al. ............. | 370/230.1 |
| 7,362,801 B2 * | 4/2008 | Goel ........................... | 375/227 |
| 2002/0097786 A1 * | 7/2002 | Kuo ............................ | 375/148 |
| 2002/0181633 A1 * | 12/2002 | Trans .......................... | 375/354 |
| 2003/0011835 A1 * | 1/2003 | Elbers et al. ................. | 359/110 |
| 2003/0099395 A1 * | 5/2003 | Wang et al. .................. | 382/165 |
| 2003/0214977 A1 * | 11/2003 | Kuo ............................ | 370/503 |
| 2004/0260547 A1 * | 12/2004 | Cohen et al. ................. | 704/233 |
| 2005/0031097 A1 * | 2/2005 | Rabenko et al. ........... | 379/93.31 |
| 2005/0186933 A1 * | 8/2005 | Trans .......................... | 455/296 |
| 2006/0062322 A1 * | 3/2006 | Namgoong et al. ......... | 375/285 |
| 2006/0072679 A1 * | 4/2006 | Chen et al. ................... | 375/261 |
| 2006/0177220 A1 * | 8/2006 | Bulow ......................... | 398/25 |
| 2007/0237273 A1 * | 10/2007 | Tan et al. .................... | 375/350 |

OTHER PUBLICATIONS

"DP83848C Phyter—Commercial Temperature Single Port 10/100 Mb/s Ethernet Physical Layer Transceiver", National Semiconductor Corporation, Sep. 2005, 82 pages.

* cited by examiner

*Primary Examiner*—Aung S Moe
*Assistant Examiner*—Abdullah Riyami

(57) ABSTRACT

A system and method is disclosed for providing real time signal to noise computation for a 100 Mb Ethernet physical layer device. A slicer module obtains a slicer error signal in the physical layer device and generates a signal that represents a square of the slicer error signal. A variance computation unit uses the signal that represents the square of the slicer error signal to calculate a value of variance of a histogram of the physical layer device by continuously accumulating a plurality of values of the square of the slicer error signal for a selected period of time. A real time signal to noise ratio is then computed using the calculated value of the variance of the histogram of the physical layer device.

20 Claims, 12 Drawing Sheets

| INPUT | SYMBOL | ERROR | INPUT | SYMBOL | ERROR |
|---|---|---|---|---|---|
| -32 | -1 | -7 | 0 | 0 | 0 |
| -31 | -1 | -7 | 1 | 0 | 1 |
| -30 | -1 | -6 | 2 | 0 | 2 |
| -29 | -1 | -5 | 3 | 0 | 3 |
| -28 | -1 | -4 | 4 | 0 | 4 |
| -27 | -1 | -3 | 5 | 0 | 5 |
| -26 | -1 | -2 | 6 | 0 | 6 |
| -25 | -1 | -1 | 7 | 0 | 7 |
| -24 | -1 | 0 | 8 | 0 | 7 |
| -23 | -1 | 1 | 9 | 0 | 7 |
| -22 | -1 | 2 | 10 | 0 | 7 |
| -21 | -1 | 3 | 11 | 0 | 7 |
| -20 | -1 | 4 | 12 | 0 | 0 |
| -19 | -1 | 5 | 13 | 1 | -7 |
| -18 | -1 | 6 | 14 | 1 | -7 |
| -17 | -1 | 7 | 15 | 1 | -7 |
| -16 | -1 | 7 | 16 | 1 | -7 |
| -15 | -1 | 7 | 17 | 1 | -7 |
| -14 | -1 | 7 | 18 | 1 | -6 |
| -13 | -1 | 7 | 19 | 1 | -5 |
| -12 | 0 | 0 | 20 | 1 | -4 |
| -11 | 0 | -7 | 21 | 1 | -3 |
| -10 | 0 | -7 | 22 | 1 | -2 |
| -9 | 0 | -7 | 23 | 1 | -1 |
| -8 | 0 | -7 | 24 | 1 | 0 |
| -7 | 0 | -7 | 25 | 1 | 1 |
| -6 | 0 | -6 | 26 | 1 | 2 |
| -5 | 0 | -5 | 27 | 1 | 3 |
| -4 | 0 | -4 | 28 | 1 | 4 |
| -3 | 0 | -3 | 29 | 1 | 5 |
| -2 | 0 | -2 | 30 | 1 | 6 |
| -1 | 0 | -1 | 31 | 1 | 7 |

FIG. 3A
(PRIOR ART)

| INPUT | SYMBOL | ERROR SQUARED | INPUT | SYMBOL | ERROR SQUARED |
|---|---|---|---|---|---|
| −32 | −1 | 64 | 0 | 0 | 0 |
| −31 | −1 | 49 | 1 | 0 | 1 |
| −30 | −1 | 36 | 2 | 0 | 4 |
| −29 | −1 | 25 | 3 | 0 | 9 |
| −28 | −1 | 16 | 4 | 0 | 16 |
| −27 | −1 | 9 | 5 | 0 | 25 |
| −26 | −1 | 4 | 6 | 0 | 36 |
| −25 | −1 | 1 | 7 | 0 | 49 |
| −24 | −1 | 0 | 8 | 0 | 64 |
| −23 | −1 | 1 | 9 | 0 | 81 |
| −22 | −1 | 4 | 10 | 0 | 100 |
| −21 | −1 | 9 | 11 | 0 | 121 |
| −20 | −1 | 16 | 12 | 0 | 144 |
| −19 | −1 | 25 | 13 | 1 | 121 |
| −18 | −1 | 36 | 14 | 1 | 100 |
| −17 | −1 | 49 | 15 | 1 | 81 |
| −16 | −1 | 64 | 16 | 1 | 64 |
| −15 | −1 | 81 | 17 | 1 | 49 |
| −14 | −1 | 100 | 18 | 1 | 36 |
| −13 | −1 | 121 | 19 | 1 | 25 |
| −12 | 0 | 144 | 20 | 1 | 16 |
| −11 | 0 | 121 | 21 | 1 | 9 |
| −10 | 0 | 100 | 22 | 1 | 4 |
| −9 | 0 | 81 | 23 | 1 | 1 |
| −8 | 0 | 64 | 24 | 1 | 0 |
| −7 | 0 | 49 | 25 | 1 | 1 |
| −6 | 0 | 36 | 26 | 1 | 4 |
| −5 | 0 | 25 | 27 | 1 | 9 |
| −4 | 0 | 16 | 28 | 1 | 16 |
| −3 | 0 | 9 | 29 | 1 | 25 |
| −2 | 0 | 4 | 30 | 1 | 36 |
| −1 | 0 | 1 | 31 | 1 | 49 |

FIG. 4B

| Bit | Bit Name | Default | Description |
|---|---|---|---|
| 15 | Var_Rdy | 0, RO | Variance Data Rdy Status: Writes Ignored<br>Indicates new data in the Variance data register. Automatically reset after two consecutive reads of VAR_DATA. |
| 14:4 | Reserved | 0, RO | Reserved: Writes Ignored |
| 3 | Var_Freeze | 0, RW | Freeze Variance Registers:<br>Freeze VAR_DATA register.<br>This bit ensures that VAR_DATA register is frozen for software reads. Automatically reset after two consecutive reads of VAR_DATA. See Software algorithm for more details. |
| 2:1 | Var_Timer | 0, RW | Variance Computation Timer(in ms):<br>Select Variance computation timer. After a new value is written, computation is automatically restarted. New variance registers are written after the timer elapses.<br><br>Var_Timer = 0 => 2 ms timer(default)<br>Var_Timer = 1 => 4 ms timer<br>Var_Timer = 2 => 6 ms timer<br>Var_Timer = 3 => 8 ms timer |
| 0 | Var_Enable | 0, RW | Variance Computation Enable:<br>Enable signal for starting Variance computation. |

FIG. 8

| Bit | Bit Name | Default | Description |
|---|---|---|---|
| 15:0 | Var Data | 0, RO | Variance Data:<br>Upon freeze, a read would return LO 16 bits of the Variance data. Second Read would return HI 16 bits of Variance data. |

FIG. 9

| Block | Old Area(sq micron) | New Area(sq micron) | Old Area(gates) | New Area(gates) | Increase |
|---|---|---|---|---|---|
| pmd_slicer | 3582.5 | 5199.14 | 358.96 | 520.95 | 160 NAND2X1 gates |
| pmd_variance_compute | N/A | 7857.25 | N/A | 787.29 | 790 NAND2X1 gates |
| Total | | | | | 950 NAND2X1 gates |

FIG. 11

SYSTEM AND METHOD FOR PROVIDING REAL TIME SIGNAL TO NOISE COMPUTATION FOR A 100MB ETHERNET PHYSICAL LAYER DEVICE

TECHNICAL FIELD OF THE INVENTION

The present invention is generally directed to Ethernet physical layer devices and, in particular, to a system and method for providing real time signal to noise computation for a 100 Mb Ethernet physical layer device.

BACKGROUND OF THE INVENTION

In many networking applications, such as industrial Ethernet, computing the value of the signal to noise ratio of a data link is an important issue. It is very desirable to know when a digital signal processor that recovers data in an Ethernet physical layer device is operating within its proper parameters. Changes in the signal to noise ratio could indicate a degradation in the quality of the data link. Notifying the system of potential issues in the cabling may allow network administrators to detect potential issues before they become critical and cause failure of the network.

The present invention will be described with reference to an exemplary Ethernet physical layer device. It is understood, however, that the principles of the present invention are not limited to the exemplary network embodiment described in this patent document.

The operation of a physical layer device is described in an IEEE publication entitled "IEEE Standards for Local and Metropolitan Area Networks: Media Access Control (MAC) Parameters, Physical Layer, Medium Attachment Units, and Repeater for 100 Mb/s Operation, Type 100BASE-T." The short name of this standard is IEEE Standard 802.3. The Physical Medium Dependent (PMD) sublayer for 100BASE-TX is defined in "Fibre Distributed Data Interface (FDDI)-Token Ring Twisted Pair Physical Layer Medium Dependent (TP-PMD)" (ANSI X3.263: 1995). The TP-PMD document provides the specification for receiving signaling on the physical medium and converting it to the digital representation required by the Physical Medium Attachment (PMA) and Physical Coding (PCS) sublayers. A commonly used method of implementing the Twisted Pair PMD sublayer utilizes a Digital Signal Processor (DSP) to recover the data and clock from the physical layer signaling.

There is a need in the art for a system and method that is capable of performing a computation of the signal to noise ratio of a data link in a 100 Mb Ethernet physical layer device. In particular, there is a need in the art for a system and method that is capable of performing a real time computation of the signal to noise ratio in a digital signal processor that recovers data in an Ethernet physical layer device.

In order to better understand the advance in the art that the present invention provides, a prior art Ethernet system will first be described. FIG. 1 illustrates a block diagram 100 of a prior art Ethernet system. FIG. 1 shows the basic components of a single Ethernet capable device connected to a physical cable. The device comprises a Media Access Controller ("Ethernet MAC 120") that is capable of sending and receiving packetized data through an Ethernet physical layer device 150 ("Ethernet PHY 150") to a physical medium such as a Category 5 Cable ("Cat5 Cable 140"). The Ethernet MAC 120 sends and receives packetized data across the MAC Data Interface. The MAC Data Interface may be either a Media Independent Interface ("MII") or a Reduced Media Independent Interface ("RMII"). The Ethernet MAC 120 controls the Ethernet PHY 150 and monitors its status though a Management Interface (designated "Mgmt Interface" in FIG. 1).

The Ethernet PHY 150 also requires a clock source 130. The clock source 130 comprises a twenty five megaHertz (25 MHz) clock when an MII interface is used. The clock source 130 comprises a fifty megaHertz (50 MHz) clock when an RMII interface is used. In addition, the Ethernet PHY 150 may comprise status light emitting diodes 160 ("Status LEDs 160") in order to externally provide visible indication of the status of the Ethernet PHY 150.

The Ethernet PHY 150 is connected to the Cat5 Cable 140 through a Magnetics unit 170 and an RJ-45 Connector 180. For simplicity and clarity, the Magnetics unit 170 and the RJ-45 Connector 180 will not be shown in subsequent figures.

FIG. 2 illustrates a block diagram of a prior art Ethernet Receive Phy 150 and Receive Mac 120. The data that is received from Category 5 cable 140 is provided to a Receive (RX) Physical Media Dependent (PMD) block 200. PMD block 200 comprises analog front end 205 and digital signal processor 210. Analog front end 205 converts the analog signals from Category 5 cable 140 into a digital form and provides the digital form of the analog signals to digital signal processor 210. Digital signal processor 210 processes the digital form of the data and recovers the transmitted data and clock signals.

As described in the IEEE Standard 802.3, the data is then sequentially provided to a Physical Medium Attachment (PMA) sublayer 215, a Physical Coding Sublayer (PCS) 220, and Media Access Controller (MAC) data interface unit 225. The MAC data interface unit 225 is capable of operating either in Media Independent Interface (MII) mode or in Reduced Media Independent Interface (RMII) mode. The MAC date interface unit 225 provides the received data to the Media Access Controller 120. As indicated in FIG. 2, Media Access Controller 120 may comprise a microprocessor unit (MPU) or a central processing unit (CPU).

The Ethernet Receive Phy 150 comprises a set of management registers in Register Block 230. The management registers are used by the Media Access Controller 120 to control the Ethernet Receive Phy 150 and to monitor the status of its operation. The management interface is commonly provided through a serial management interface defined in Clause 22 of the IEEE 802.3 specification. In addition, the Ethernet Receive Phy 150 shown in FIG. 2 is capable of providing an interrupt signal to the Media Access Controller 120.

The Ethernet Receive Phy 150 is designed to work on random (or pseudo-random) data that is encoded using a three level signaling method known as MLT3 as defined in the TP-PMD specification. A prior art digital signal processor 210 comprises modules (e.g., equalizer module, automatic gain control module, base line wander module) (not shown in FIG. 2) that operate to remove artifacts that are introduced into the transmitted data stream (e.g., by the channel and transformer). A timing recovery module (not shown in FIG. 2) is then used to lock onto the received signal to recover the clock and the data. A slicer module (not shown in FIG. 2) maps the output of the digital signal processor 210 into three types of data output, representing the three levels in MLT3 signaling. The three types of data output are minus one, zero, and plus one. The three types of data output are represented by the expression $\{-1, 0, 1\}$.

The slicer is implemented such that each possible output of the digital signal processor maps to one of the three slicer data values with an associated error value. The ideal values of the digital signal processor outputs are defined to be minus twenty four, zero, and plus twenty four $\{-24, 0, 24\}$ and map to the slicer outputs minus one, zero, and plus one {−1, 0, 1} respectively with a slicer error of zero.

The error value is the difference of the actual value minus the ideal value. For example, a digital signal processor data output of minus twenty (−20) would result in a slicer output of minus one (−1) and a slicer error of plus four (4). FIG. 3A shows the slicer decision and error values of the prior art based on the input value from the digital signal processor. The slicer error is restricted to a maximum value of plus or minus seven in the prior art example.

Because the nature of the data is effectively a random distribution, an assumption may be made that on average the minus one (−1) data output will appear twenty five percent (25%) of the time, the zero (0) data output will appear fifty percent of the time (50%), and the plus one data output will appear twenty five percent (25%) of the time. FIG. 3B illustrates a histogram of received data. The peak at the left centered on the minus twenty four (−24) value represents the minus one (−1) data output. The central peak centered on the zero value (0) represents the zero (0) data output. The peak at the right centered on the plus twenty four (24) value represents the plus one (1) data output.

Based on the expected distribution, if there were no noise or distortion of the received signal, the effective signal (ES) would be given by:

$$ES = (0.25)(-24)^2 + (0.50)(0)^2 + (0.25)(24)^2 = 288 \quad (1)$$

The effective variance (EV) of a received signal (with or without noise or distortion) is given by:

$$EV = \frac{[\text{Variance}(-1) + \text{Variance}(0) + \text{Variance}(1)]}{SymbolCount} \quad (2)$$

The Variance values in Equation (2) are the sum of the square of each error value for the associated data value. Because the data values are assumed to have a random distribution, the numerator in Equation (2) could be expressed as the sum of the error squared, independent of the data value.

The signal to noise ratio (SNR) for a received signal is calculated from the expression:

$$SNR = 10 \log_{10} \frac{EffectiveSignal}{EffectiveVariance} = 10 \log_{10} \frac{288}{EffectiveVariance} \quad (3)$$

A prior art digital signal processor (such as digital signal processor 210) may comprise software that is capable of calculating a signal to noise ratio (SNR) for the received data by periodically polling the Ethernet Receive Phy 150. The prior art software uses an error signal from digital signal processor 210 to compute the values of effective variance and the signal to noise ratio (SNR).

One major drawback of the prior art approach is that the polling rate is much lower than the data rate. This means the polling method is very likely to miss high rate error data. The slow polling rate also results in a very long period of time to gather enough data for a statistically significant result. Therefore, the prior art polling method does not give sufficiently complete information. Another major drawback of the prior art approach is that the polling method is computationally intensive and makes extensive demands on the computing resources of the digital signal process 210.

For these reasons there is a need in the art for a system and method that is capable of performing an efficient real time computation of the signal to noise ratio of a data link in a 100 Mb Ethernet physical layer device.

Before undertaking the Detailed Description of the Invention below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

The term "controller" means any device, system, or part thereof that controls at least one operation. A controller may be implemented in hardware, software, firmware, or combination thereof. It should be noted that the functionality associated with any particular controller may be centralized or distributed, whether locally or remotely.

Definitions for certain words and phrases are provided throughout this patent document, those of ordinary skill in the art should understand that in many, if not most instances, such definitions apply to prior uses, as well as to future uses, of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts:

FIG. 3A illustrates slicer decision and error values based on input values from a prior art digital signal processor;

FIG. 4B illustrates slicer decision and error squared values in accordance with the principles of the present invention;

FIG. 8 illustrates a Variance Control/Status Register of the present invention;

FIG. 9 illustrates a Variance Data Register of the present invention;

FIG. 11 illustrates a table showing how many logic gates are required to implement the variance computation mode of the present invention;

DETAILED DESCRIPTION OF THE INVENTION

FIGS. 4A through 15, discussed below, and the various embodiments used to describe the principles of the present invention in this patent document are by way of illustration only and should not be construed in any way to limit the scope of the invention. Those skilled in the art will understand that the principles of the present invention may be implemented with any type of suitably arranged network physical layer device.

Figure 4A:
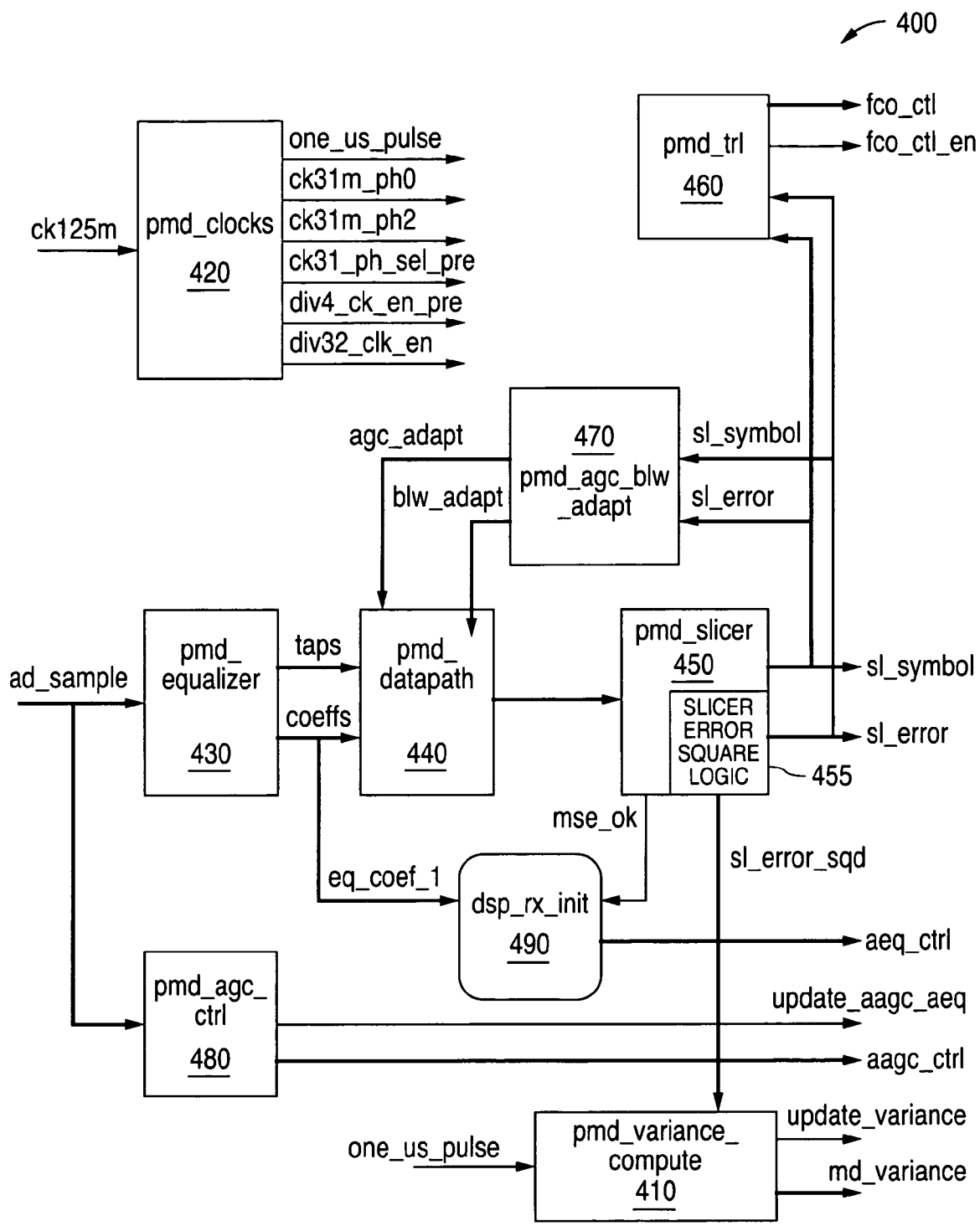
FIG. 4A illustrates a block diagram of digital signal processor in an Ethernet physical layer device comprising a variance computation unit of the present invention.

FIG. 4A illustrates a block diagram of digital signal processor 400 in an Ethernet physical layer device that comprises a variance computation unit 410 of the present invention. The variance computation unit 410 of the present invention is designated "pmd_variance_compute" in FIG. 4. The variance computation unit implements the computationally intensive portion of the signal to noise ratio calculation.

The digital signal processor 400 comprises various modules for processing received digital signals. The digital signal processor 400 comprises a clock module 420 ("pmd_clocks" 420), a digital equalizer module 430 ("pmd_equalizer" 430), a datapath module 440 ("pmd_datapath" 440), a slicer module 450 ("pmd_slicer" 450), a timing recovery loop module 460 ("pmd_trl" 460), an automatic gain control (AGC) and base line wander (BLW) adaptation module 470 ("pmd_agc_blw_adapt" 470), an analog automatic gain control module 480 ("pmd_agc_ctrl" 480), and a digital signal processing (DSP)/analog front end (AFE) initialization sequence module 490 ("dsp_rx_init" 490). The letters "pmd" in the labels stand for "physical medium dependent."

The operation of the various modules of the digital signal processor 400 are well known in the art. The operation of the modules of the digital signal processor 400 will be discussed only to the extent necessary to explain the structure and operation of the variance computation unit 410 of the present invention.

The slicer module 450 ("pmd_slicer" 450) comprises a slicer error square logic unit 455 of the present invention. The slicer error square logic unit 455 generates a signal that represents the square of the slicer error. That is, the slicer error square logic unit 455 provides a value that results from multiplying a value of the slicer error signal by itself. The slicer error square logic unit 455 provides the value of the "square" of the slicer error (designated "sl_error_sqd") to a first input of the variance computation unit 410. In one advantageous embodiment of the invention the "sl_error_sqd" signal comprises an eight (8) bit digital signal designated "sl_error_sqd [7:0]". FIG. 4B shows slicer decision and error squared values based on the input values from digital signal processor 400.

Figure 1:
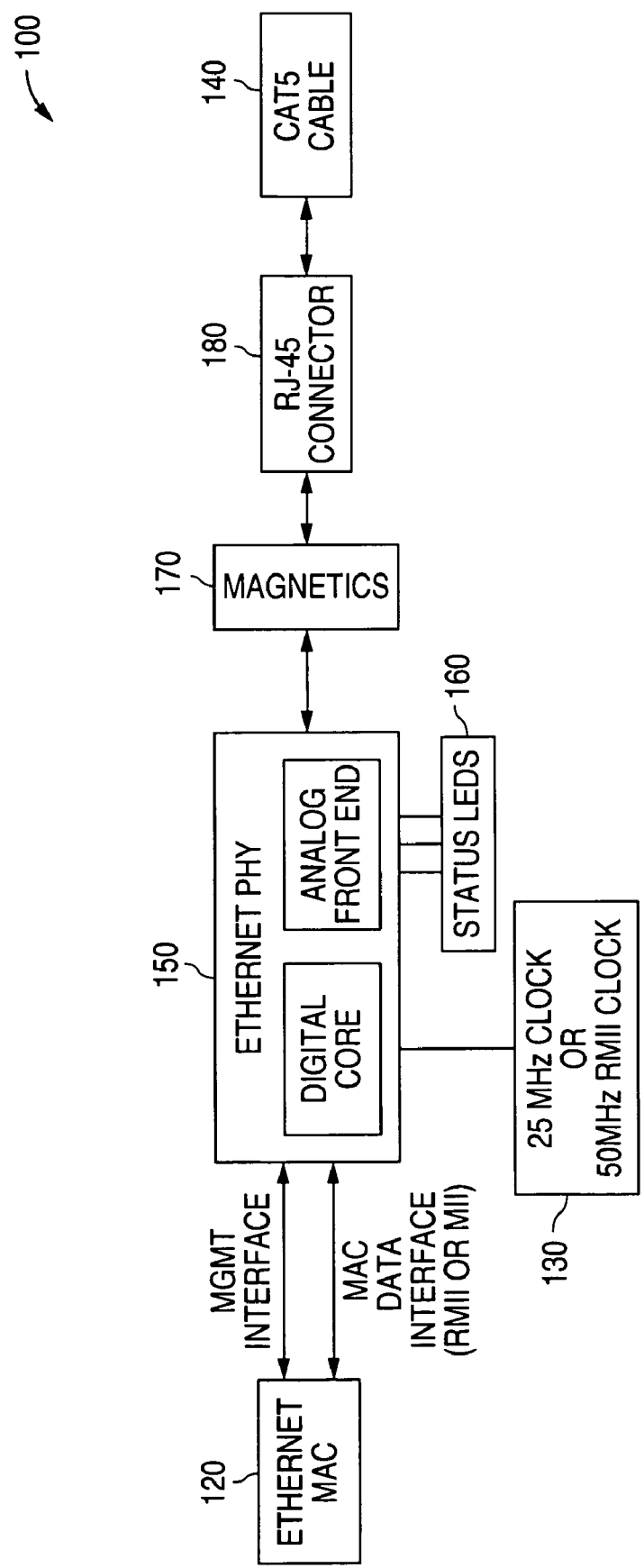
FIG. 1 illustrates a block diagram of a prior art Ethernet system.
Figure 2:
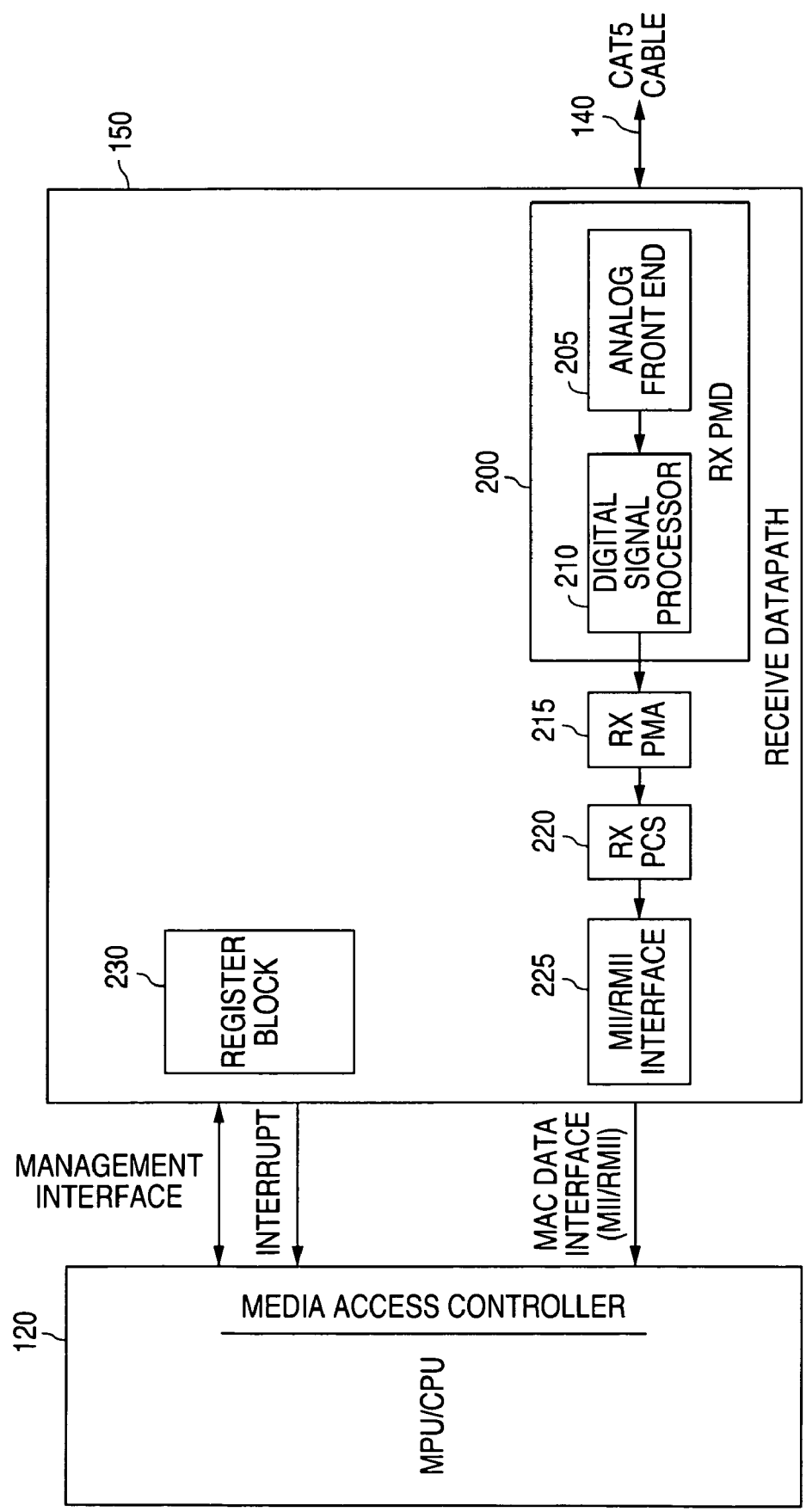
FIG. 2 illustrates a block diagram of a prior art Ethernet physical layer device.
Figure 3B:
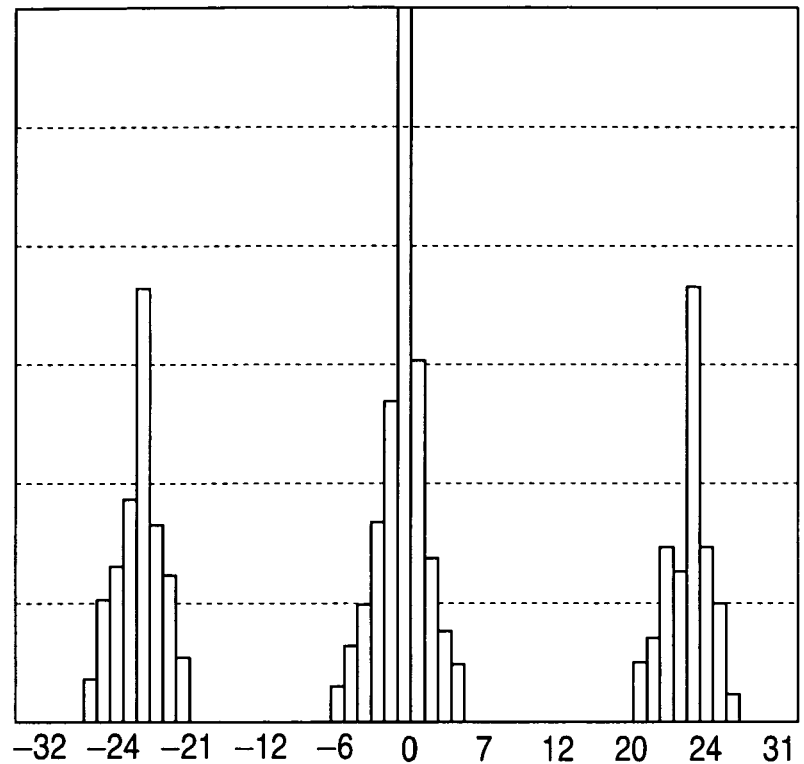
FIG. 3B illustrates an exemplary receiver histogram for variance calculation.
Figure 5:
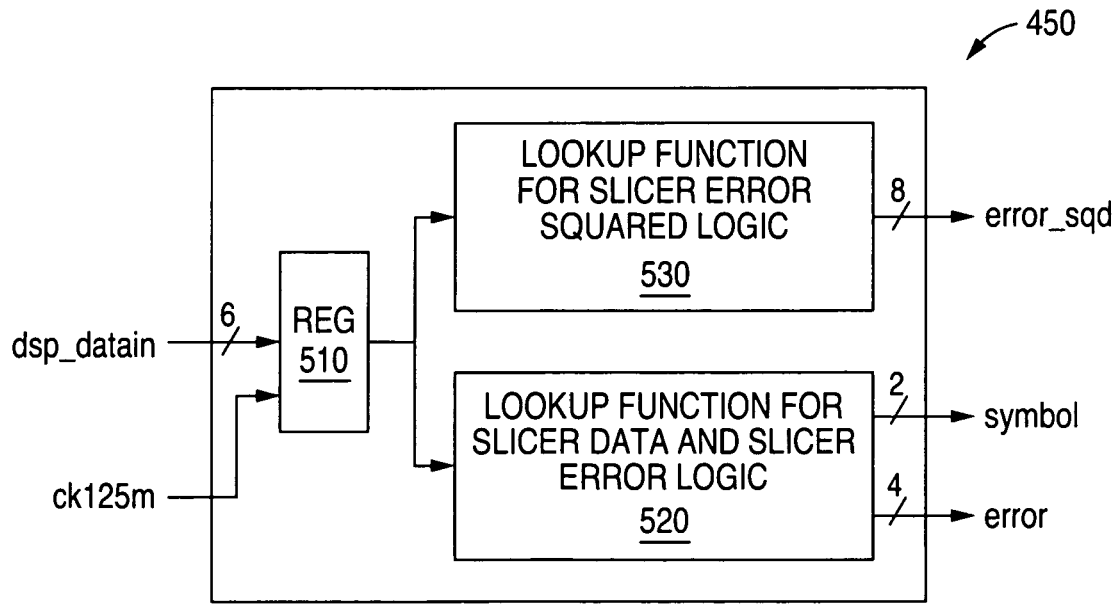
FIG. 5 illustrates a block diagram showing a slicer error square logic unit of the present invention.

FIG. 5 illustrates a block diagram showing a slicer module 450 of the present invention. In one advantageous embodiment of the present invention the data signals (designated "dsp_datain") are provided to a slicer data register 510. The slicer data register 510 also receives a clock signal (designated "ck125m") from a 125 MHz clock source (not shown). The slicer data register 510 provides the data signals to a lookup function block 520 for the slicer data and slicer error logic. The output of the lookup function block 520 comprises a two (2) bit digital signal that represents a data symbol and a four (4) bit digital signal that represents the slicer error.

The slicer data register 510 also provides the data signals to a lookup function block 530 for the slicer error squared logic. The output of the lookup function block 530 is an eight (8) bit digital signal that represents the "square" of the slicer error. The slicer error square logic unit 455 comprises the lookup function block 530.

The eight (8) bit digital signal that represents the "square" of the slicer error is designated "error_sqd" in FIG. 5. The expression "error_sqd" in FIG. 5 is equivalent to the expression "sl_error_sqd[7:0]" previously used to designate the eight (8) bit digital signal that represents the "square" of the slicer error.

Figure 6:
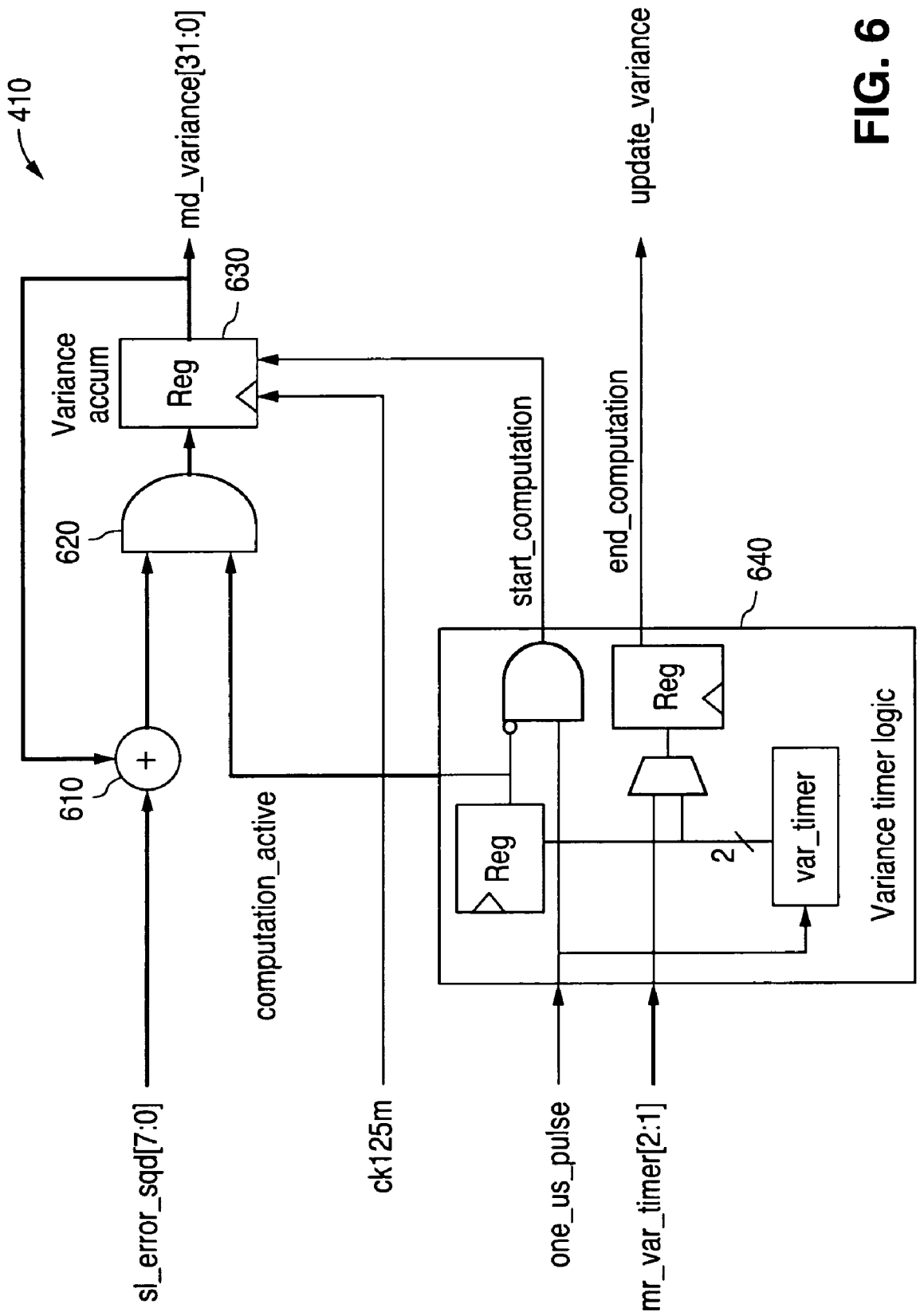
FIG. 6 illustrates a block diagram showing a variance computation unit of the present invention.

FIG. 6 illustrates a block diagram that shows the variance computation unit 410 in more detail. The variance computation unit 410 computes the sum of the slicer error squared values over a specified period of time. As shown in FIG. 6, there are four inputs to the variance computation unit 410. The first input is the eight (8) bit digital signal "sl_error_sqd [7:0] from the slicer error square logic unit 455. The second input to the variance computation unit 410 is a clock signal (designated "ck125m") from a 125 MHz clock source (not shown). The third input to the variance computation unit 410 is a one (1) microsecond pulse signal (designated "one_us_pulse") from the clock module 420. The fourth input to the variance computation unit 410 is a time value (designated "mr_var_timer[2:1]") that specifies the time period for the variance computation time. The time period may be selected by a user command to have one of the following values: two milliseconds (2 ms), four milliseconds (4 ms), six milliseconds (6 ms), or eight milliseconds (8 ms).

There are two outputs of the variance computation unit 410. The first output is a thirty two (32) bit digital signal (designated "md_variance") that represents the computed variance data for the receiver histogram. The second output is one (1) bit digital signal (designated "update_variance") that indicates that a variance computation has been completed. An alternate expression for the "update_variance" designation is an "end_computation" designation.

The variance computation unit 410 comprises an adder 610, an AND logic gate 620, a variance accumulator register 630 and a variance timer logic unit 640. The operation of the variance timer logic unit 640 will be described more fully below. The eight (8) bit digital signal "sl_error_sqd[7:0] from the slicer error square logic unit 455 is provided to a first input of adder 610. The output of adder 610 is provided to a first input of the AND logic gate 620. The second input of the AND logic gate 620 receives a start signal (designated "computation_active") from the variance timer logic unit 640. When the "computation_active" signal is asserted, the AND logic gate 620 passes the output of adder 610 to a first input of variance accumulator register 630.

The variance data register 630 also receives a 125 MHz clock signal (designated "ck125m") on its clock input. The variance accumulator register 630 also receives a start signal (designated "start_computation") from variance timer logic unit 640. The "start_computation" signal resets the variance accumulator register 630 at the start of a computation.

The output of the variance accumulator register 630 is fed back to a second input of adder 610. Adder 610 adds the fed back value on the second input of adder 610 to the incoming value of the square of the slicer error on the first input of adder 610. Register 630 continues to accumulate and store the calculated value of the variance as long as the "computation_active" signal is asserted.

When the time period of the variance calculation comes to an end, then the variance timer logic unit 640 disables the "computation_active" signal and enables the "end_computation" signal (also referred to as the "update_variance" signal). The accumulated value of variance (designated "md_variance[31:0]") is then stored in a Variance Data Register (designated "VAR_DATA") shown in FIG. 9. The Variance Data Register is located in the register block 230 of the Ethernet physical layer device 150.

In this manner the variance computation unit 410 computes the variance of the receiver histogram by continuously accumulating the values of the "sl_error_sqd[7:0]" signal for a period of time. After the time period for calculation comes to an end, the variance computation unit 410 updates the thirty two (32) bit variance value in the Variance Data Register.

Figure 7:
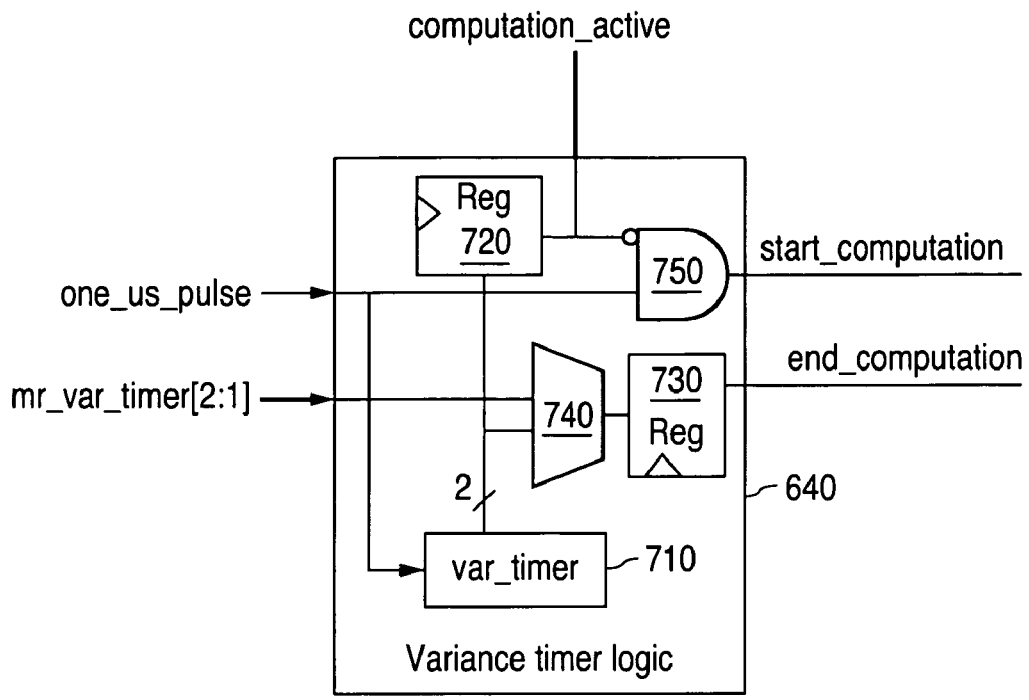
FIG. 7 illustrates a block diagram showing a variance timer logic unit of the variance computation unit of the present invention.

FIG. 7 illustrates a block diagram 700 showing the variance timer logic unit 640 of the variance computation unit 410. The variance timer logic unit 640 comprises a variance timer 710 (designated "var_timer" 710), a computation active register 720, an end computation register 730, a comparator 740 and an AND logic gate 750 coupled together as shown in FIG. 7.

A two (2) bit digital signal that represents the computation time period is set in the Variance Control/Status Register (designated "VAR_CTRL") shown in FIG. 8. The Variance Control/Status Register is located in the register block 230 of the Ethernet physical layer device 150. The variance timer logic unit 640 receives the two (2) bit digital signal (designated "mr_var_timer[2:1]" in a first input of comparator 740. The variance timer logic unit 640 also receives a one (1) microsecond clock signal (designated "one_us_pulse"). The one (1) microsecond clock signal is provided to an input of the AND logic gate 750.

When variance timer 710 is enabled, variance timer 710 (1) enables the "start_computation" signal and the "one_us_pulse" signal is asserted, and (2) enables the "computation_active" signal via the computation active register 720 immediately following the "start_computation" signal. When the variance timer 710 reaches the time designated by the "mr_var_timer[2:1]" signal, the comparator 740 enables the "end_computation" signal via end computation register 730.

FIG. 8 illustrates the Variance Control/Status Register of the present invention. The Variance Control/Status Register ("VAR_CTRL") contains sixteen (16) bits. The sixteen (16) bits are as follows:

Bit 15 is a Variance Data Ready Status bit designated "Var_Rdy." Bit 15 indicates the presence of new data in the Variance Data Register. Bit 15 is automatically reset after two (2) consecutive reads of the Variance Data Register ("VAR_DATA"). Writes to Bit 15 are ignored.

Bits 14 through 4 are reserved bits. Writes to these bits are ignored. Bit 13 is a Freeze Variance Register bit designated "Var_Freeze." When Bit 13 is enabled, Bit 13 freezes (i.e., restricts access to) the Variance Data Register ("VAR_DATA") so that no data can be written to the Variance Data Register. When Bit 13 is disabled, data can be written to the Variance Data Register. Bit 13 ensures that the Variance Data Register is frozen for software reads. Bit 13 is automatically reset after two (2) consecutive reads of the Variance Data Register.

Bit 2 and Bit 1 are the variance computation timer bits designated "Var_Timer." The default value of two (2) milliseconds is represented by a value of zero (i.e., Bit 2=0 and Bit 1=0). The value of one (i.e., Bit 2=0 and Bit 1=1) represents four (4) milliseconds. The value of two (i.e., Bit 2=1 and Bit 1=0) represents six (6) milliseconds. The value of three (i.e., Bit 2=1 and Bit 1=1) represents eight (8) milliseconds.

After a new value is written to the variance computation timer bits, the computation process is automatically restarted. The variance register with a new value of variance is written after the timer elapses.

Bit 0 is a Variance Computation Enable bit designated "Var_Enable." When Bit 0 is enabled, Bit 0 provides the enable signal for starting the variance computation process. When Bit 0 is disable, the variance computation process is disabled.

FIG. 9 illustrates the Variance Data Register of the present invention. The Variance Data Register ("VAR_DATA") contains the variance data in sixteen (16) bits. Bits 15 through 0 are the variance data bits designated "Var Data." The contents of the Variance Data Register are valid only when the "Var_Rdy" bit (Bit 15 of the Variance Control/Status Register) is enabled. When the Freeze Variance Register bit (Bit 3 of the Variance Control/Status Register) is enabled, upon the first read the Variance Data Register returns the sixteen (16) low order ("LO") bits of the variance data. Upon the second read, the Variance Data Register returns the sixteen (16) high order "HO" bits of the variance data.

Therefore, when the variance data is to be read, the software first enables the Freeze Variance Register bit (Bit 3 of the Variance Control/Status Register) to freeze the variance data value in the Variance Data Register. Then the software executes two sequential reads to obtain the thirty two (32) bits that represent the value of the variance data. The Freeze Variance Register bit is automatically disabled after the second read.

Figure 10:
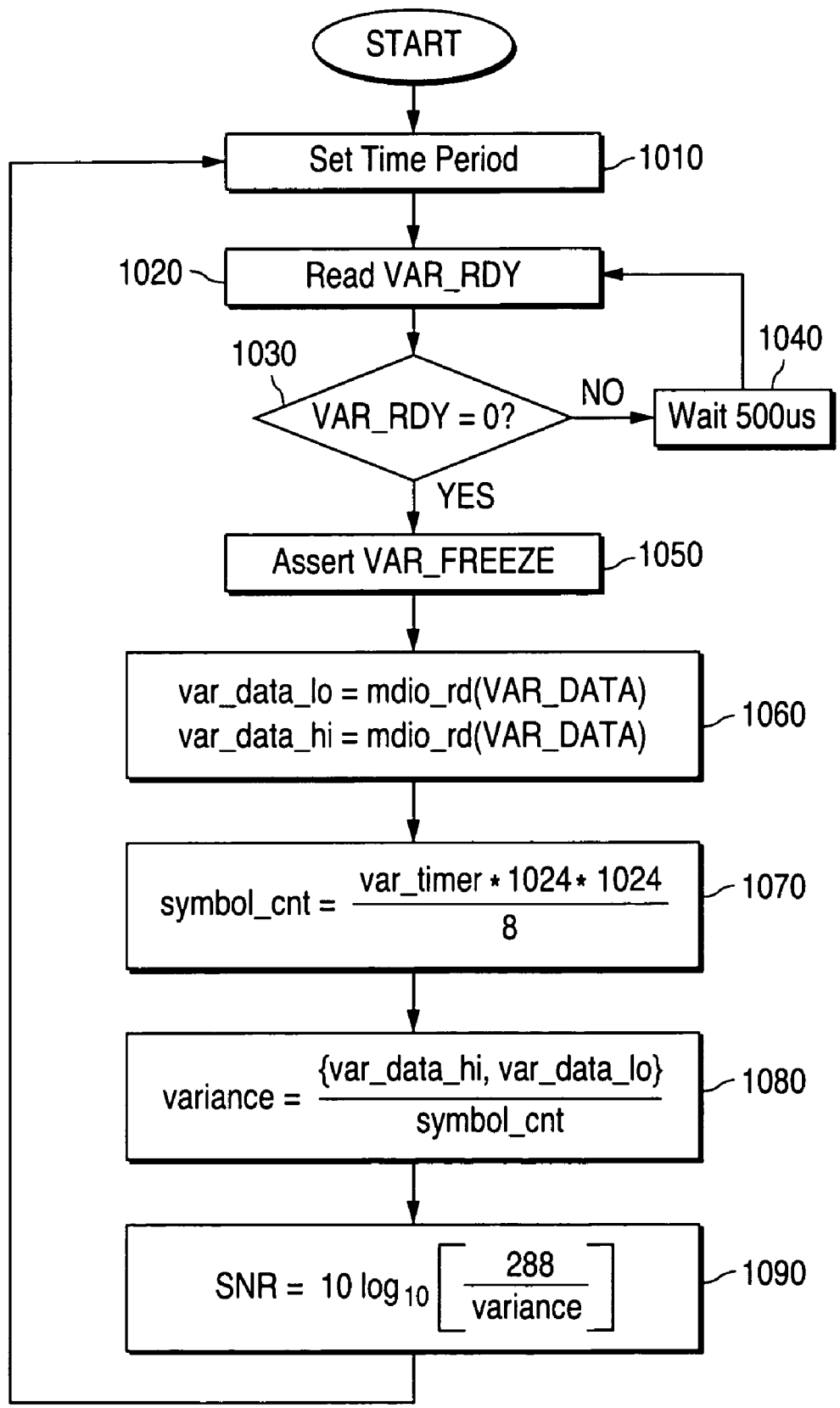
FIG. 10 illustrates a flow chart illustrating steps of the method of the present invention.

FIG. 10 illustrates a flow chart illustrating steps of the method of the present invention. The calculations in the method may be performed by software in the digital signal processor 400. In the first step of the method the value is set for the computation time period. That is, the value of "mr_var_timer[2:1]" is set (step 1010). The default value of "mr_var_timer[2:1]" is two (2) milliseconds.

Then the value of Bit 15 of the Variance Control/Status Register (the Variance Data Ready Status "VAR_RDY" bit) is read (step 1020). Then a determination is made whether the value of the VAR_RDY bit is zero (decision step 1030). If the value is nonzero then the process waits for a period of five hundred microseconds (500 µs) (step 1040) and control returns to step 1020. The value of the VAR_RDY bit is automatically reset to zero after two consecutive reads of the variance data VAR_DATA.

When the value of the VAR_RDY bit is determined to be zero, then the Freeze Variance Register Bit (Bit 3 of the Variance Control/Statue Register) is asserted (step 1050). Then the Variance Data Register ("VAR_DATA") is read twice. The first read obtains the sixteen (16) low order bits of the variance data and stores them in a location called "var_data_lo." The second read obtains the sixteen (16) high order bits of the variance data and stores then in a location called "var_data_hi." (step 1060).

The symbol count (designated "symbol_cnt") is then calculated (step 1070). The symbol count is calculated by multiplying the value of the calculation time period "var_timer" times one thousand twenty four (1024) two times and dividing the result by eight (8). The variance is then calculated (step 1080). The variance is calculated by dividing the variance data (designated by {var_data_hi, var_data_lo} by the symbol count.

Lastly, the signal to noise ratio (SNR) is calculated (step 1090). The signal to noise ratio (SNR) is calculated by (1) dividing two hundred eighty eight (288) by the variance, and (2) taking the logarithm (Base 10) of the result, and (3) multiplying the logarithm by ten (10). Control then passes back to step 1010 and the computation process is repeated.

The present invention calculates the signal to noise ratio (SNR) in a real time manner in an Ethernet physical layer device. The present invention comprises the hardware that comprises the slicer error square logic unit 455 (located in the pmd_slicer 450) and the hardware that comprises the variance computation unit 410 (designated "pmd_variance_compute"). FIG. 11 illustrates a table showing how many logic gates are required to implement the hardware of the present invention.

The pmd_slicer block 450 without the hardware of the present invention occupies approximately three thousand five hundred eighty two and five tenths square microns (3582.5 $\mu m^2$) of area. This area in gates represents approximately three hundred fifty eight and ninety six hundredths (358.96) gates. The pmd_slicer 450 with the hardware of the present invention occupies approximately five thousand one hundred ninety nine and fourteen hundredths square microns (5199.14 $\mu m^2$) of area. This area in gates represents approximately five hundred twenty and ninety five hundredths (520.95) gates. Therefore, the increase in the number of gates to implement the hardware of the invention in the pmd_slicer 450 is one hundred sixty (160) NAND2X1 gates.

The hardware of the pmd_variance_compute 410 of the present invention occupies approximately seven thousand eight hundred fifty seven and twenty five square microns (7857.25 $\mu m^2$) of area. This area in gates represents approximately seven hundred eighty seven and twenty nine hundredths (787.29) gates. Therefore, the number of gates to implement the hardware of the invention in the pmd_variance_compute 410 is seven hundred ninety (790) NAND2X1 gates. This means that the total number of additional gates required for the hardware to implement the present invention is nine hundred fifty (950) NAND2X1 gates (i.e., 160 gates plus 790 gates).

Figure 12:
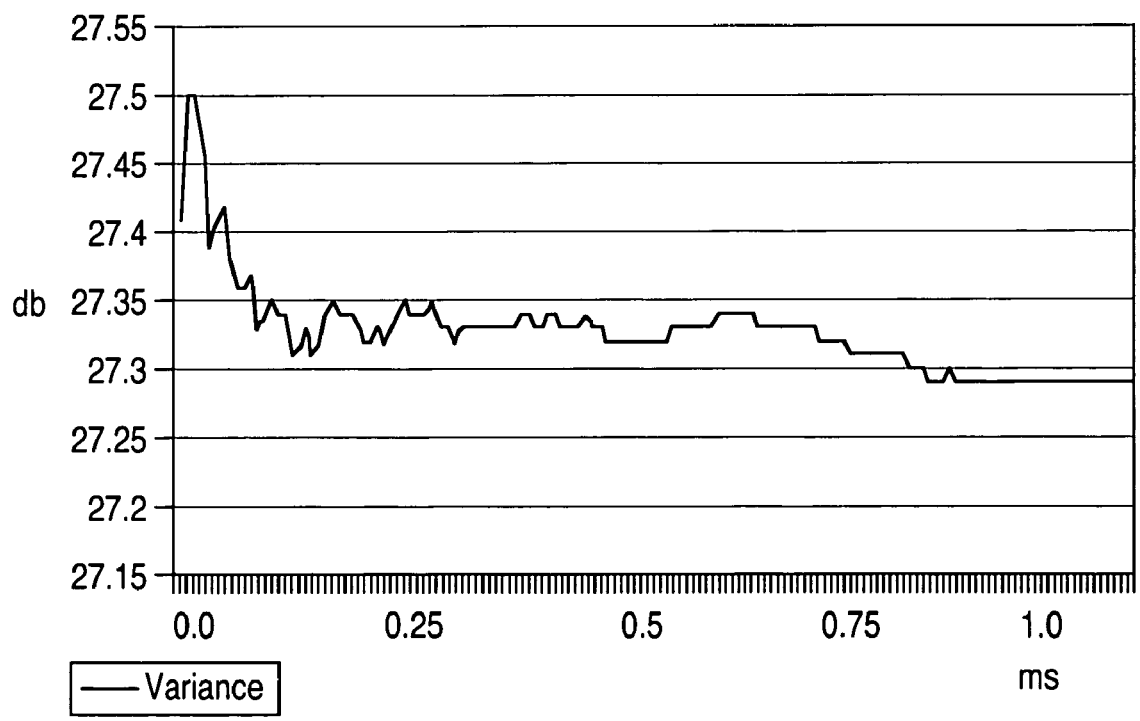
FIG. 12 illustrates a graph showing the stabilization of variance values of the present invention after one millisecond of accumulation time.

The present invention provides a superior method for computing the signal to noise ratio (SNR) in an Ethernet physical layer device. FIG. 12 illustrates a graph showing the variance values calculated by the method of the present invention after one millisecond of accumulation time. FIG. 12 shows that the variance/SNR values stabilize after one millisecond of accumulation time. The value of the variance/SNR values are more accurate with more accumulation time because jitter/ppm effects are filtered out.

Figure 13:
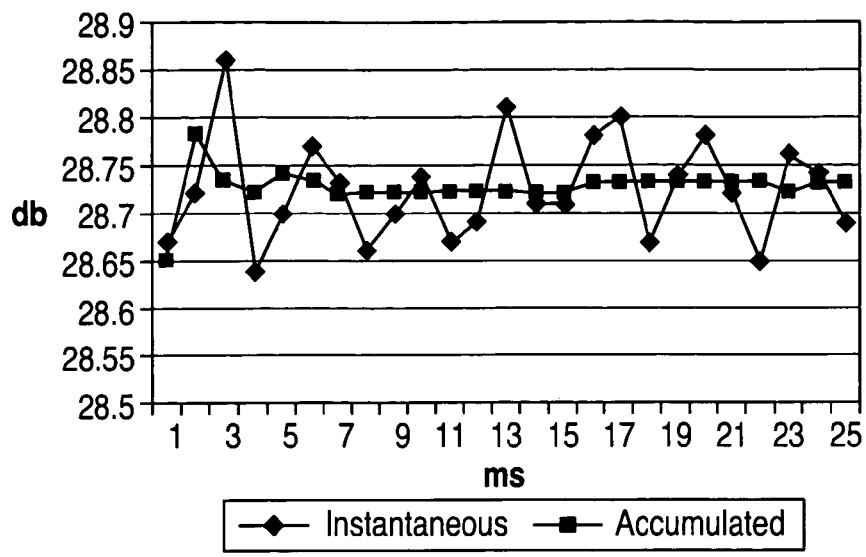
FIG. 13 illustrates a graph showing a comparison of a prior art software computed signal to noise ratio (SNR) accumulated for twenty five milliseconds with an instantaneous value of the hardware computed signal to noise ratio (SNR) of the present invention accumulated for one millisecond.

FIG. 13 illustrates a graph showing a comparison of a prior art software computed signal to noise ratio (SNR) accumulated for twenty five milliseconds with an instantaneous value of the hardware computed signal to noise ratio (SNR) of the present invention accumulated for one millisecond.

Figure 14:
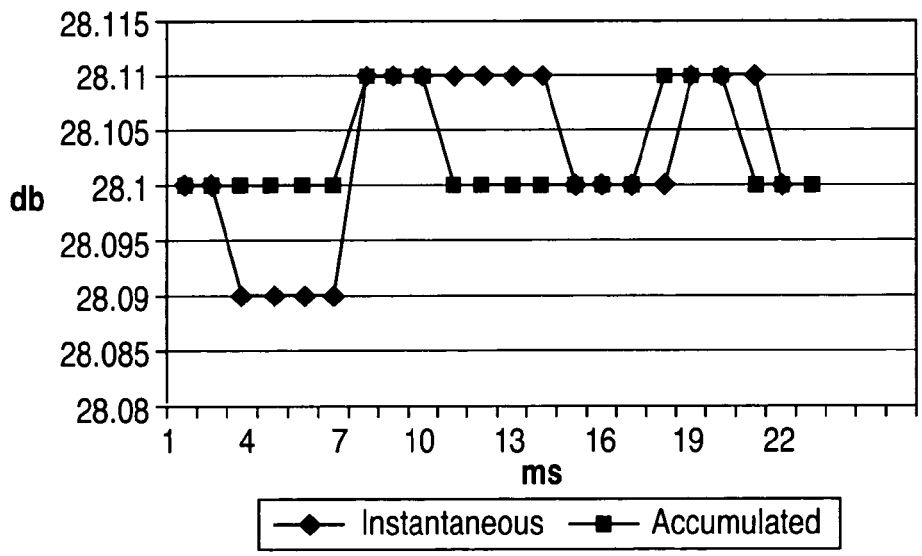
FIG. 14 illustrates a graph showing a comparison of a prior art software computed signal to noise ratio (SNR) accumulated for twenty five milliseconds with an instantaneous value of the hardware computed signal to noise ratio (SNR) of the present invention accumulated for four milliseconds.

FIG. 14 illustrates a graph showing a comparison of a prior art software computed signal to noise ratio (SNR) accumulated for twenty five milliseconds with an instantaneous value of the hardware computed signal to noise ratio (SNR) of the present invention accumulated for four milliseconds.

Figure 15:
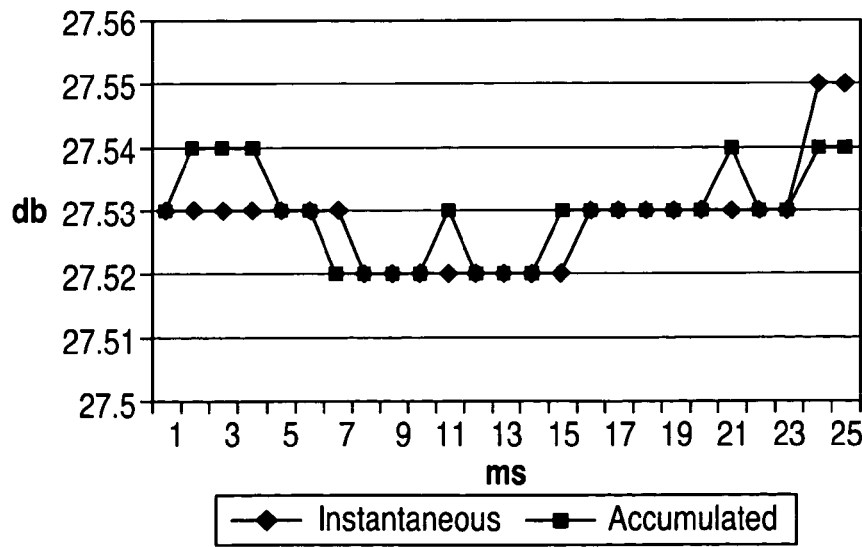
FIG. 15 illustrates a graph showing a comparison of a prior art software computed signal to noise ratio (SNR) accumulated for twenty five milliseconds with an instantaneous value of the hardware computed signal to noise ratio (SNR) of the present invention accumulated for eight milliseconds.

FIG. 15 illustrates a graph showing a comparison of a prior art software computed signal to noise ratio (SNR) accumulated for twenty five milliseconds with an instantaneous value of the hardware computed signal to noise ratio (SNR) of the present invention accumulated for eight milliseconds.

The foregoing description has outlined in detail the features and technical advantages of the present invention so that persons who are skilled in the art may understand the advantages of the invention. Persons who are skilled in the art should appreciate that they may readily use the conception and the specific embodiment of the invention that is disclosed as a basis for modifying or designing other structures for carrying out the same purposes of the present invention. Persons who are skilled in the art should also realize that such equivalent constructions do not depart from the spirit and scope of the invention in its broadest form.

Although the present invention has been described with an exemplary embodiment, various changes and modifications may be suggested to one skilled in the art. It is intended that the present invention encompass such changes and modifications as fall within the scope of the appended claims.

What is claimed is:

1. An apparatus that computes a variance of a histogram of a receive physical layer device, the apparatus comprising:
    a slicer module configured to generate a signal that represents a square of a slicer error signal; and
    a variance computation unit configured to use the signal that represents the square of the slicer error signal to calculate the value of variance of the histogram of the receive physical layer device, wherein the variance computation unit comprises:
        a variance timer logic unit having (i) a first output configured to provide an indication whether calculation of the value of variance is active and (ii) a second output configured to provide an indication whether calculation of the value of variance is starting;
        an adder having (i) a first input configured to receive a plurality of values of the square of the slicer error signal, (ii) a second input, and (iii) an output;
        an AND logic gate having (i) a first input coupled to the output of the adder, (ii) a second input coupled to the first output of the variance timer logic unit, and (iii) an output; and
        a variance accumulator register having (i) a first input coupled to the output of the AND logic gate, (ii) a second input coupled to the second output of the variance timer logic unit such that the variance accumulator register is reset in response to the indication that calculation of the value of variance is starting, and (iii) an output coupled to the second input of the adder.

2. The apparatus as set forth in claim 1, wherein the variance computation unit is configured to calculate the value of variance by continuously accumulating the plurality of values of the square of the slicer error signal for a selected period of time.

3. The apparatus as set forth in claim 2, wherein the selected period of time is selected by a user command to have a value of one of: two milliseconds, four milliseconds, six milliseconds, and eight milliseconds.

4. The apparatus as set forth in claim 1, wherein the slicer module comprises:
    a slicer data register configured to receive data signals; and
    a lookup function block configured to receive the data signals from the slicer data register and to generate a digital signal that represents the square of the slicer error signal.

5. The apparatus as set forth in claim 1, wherein the variance timer logic unit comprises:
    a timer configured to count a specified period of time;
    a first register having (i) an input coupled to an output of the timer and (ii) an output that comprises the first output of the variance timer logic unit;
    a second AND logic gate having (i) an inverted first input coupled to the output of the first register, (ii) a second input configured to receive a clock signal, and (iii) an output that comprises the second output of the variance timer logic unit;

a comparator configured to compare a value at the output of the timer and a value identifying the specified period of time; and a second register having (i) an input coupled to an output of the comparator and (ii) an output that comprises a third output of the variance timer logic unit, the third output configured to provide an indication whether calculation of the value of variance is complete.

6. The apparatus as set forth in claim 1, wherein:

the variance timer logic unit is configured to receive a signal that represents a period of time selected by a user to operate the variance computation unit; and the variance timer logic unit is configured to send control signals to the variance computation unit to cause the variance computation unit to operate for the selected period of time.

7. The apparatus as set forth in claim 1, wherein the apparatus further comprises:

a Variance Control/Status Register that comprises control bits configured to control the variance computation unit during calculation of the value of variance; and a Variance Data Register that is configured to receive from the variance computation unit the value of variance.

8. The apparatus as set forth in claim 1, wherein the receive physical layer device comprises an Ethernet receive physical layer device.

9. The apparatus as set forth in claim 1, wherein the apparatus is configured to use the calculated value of variance to calculate a signal-to-noise ratio for data signals received in the receive physical layer device.

10. An apparatus that computes a real-time signal-to-noise ratio of data signals in a receive physical layer device, the apparatus comprising:

a digital signal processor that comprises a slicer module, wherein the slicer module is configured to generate a signal that represents a square of a slicer error signal; and a variance computation unit configured to use the signal that represents the square of the slicer error signal to calculate a value of a variance of a histogram of the receive physical layer device;

wherein the digital signal processor is configured to calculate the real-time signal-to-noise ratio using the calculated value of variance; and wherein the variance computation unit comprises:

a variance timer logic unit having (i) a first output configured to provide an indication whether calculation of the value of variance is active and (ii) a second output configured to provide an indication whether calculation of the value of variance is starting;

an adder having (i) a first input configured to receive a plurality of values of the square of the slicer error signal, (ii) a second input, and (iii) an output;

an AND logic gate having (i) a first input coupled to the output of the adder, (ii) a second input coupled to the first output of the variance timer logic unit, and (iii) an output; and a variance accumulator register having (i) a first input coupled to the output of the AND logic gate, (ii) a second input coupled to the second output of the variance timer logic unit such that the variance accumulator register is reset in response to the indication that calculation of the value of variance is starting, and (iii) an output coupled to the second input of the adder.

11. The apparatus as set forth in claim 10, wherein the variance computation unit is configured to calculate the value of variance by continuously accumulating the plurality of values of the square of the slicer error signal for a selected period of time.

12. The apparatus as set forth in claim 11, wherein the selected period of time is selected by a user command to have a value of one of: two milliseconds, four milliseconds, six milliseconds, and eight milliseconds.

13. The apparatus as set forth in claim 10, wherein the slicer module comprises:

a slicer data register configured to receive the data signals; and a lookup function block configured to receive the data signals from the slicer data register and to generate a digital signal that represents the square of the slicer error signal.

14. The apparatus as set forth in claim 10, wherein the variance timer logic unit comprises:

a timer configured to count a specified period of time;

a first register having (i) an input coupled to an output of the timer and (ii) an output that comprises the first output of the variance timer logic unit;

a second AND logic gate having (i) an inverted first input coupled to the output of the first register, (ii) a second input configured to receive a clock signal, and (iii) an output that comprises the second output of the variance timer logic unit;

a comparator configured to compare a value at the output of the timer and a value identifying the specified period of time; and a second register having (i) an input coupled to an output of the comparator and (ii) an output that comprises a third output of the variance timer logic unit, the third output configured to provide an indication whether calculation of the value of variance is complete.

15. The apparatus as set forth in claim 10, wherein:

the variance timer logic unit is configured to receive a signal that represents a period of time selected by a user to operate the variance computation unit; and the variance timer logic unit is configured to send control signals to the variance computation unit to cause the variance computation unit to operate for the selected period of time.

16. The apparatus as set forth in claim 10, wherein the apparatus further comprises:

a Variance Control/Status Register that comprises control bits configured to control the variance computation unit during calculation of the value of variance; and a Variance Data Register that is configured to receive from the variance computation unit the value of variance.

17. The apparatus as set forth in claim 10, wherein the receive physical layer device comprises an Ethernet receive physical layer device.

18. An apparatus that computes a real-time signal-to-noise ratio of data signals in a receive physical layer device, the apparatus comprising:

a slicer module configured to generate a signal that represents a square of a slicer error signal; and a variance computation unit configured to calculate a value of a variance of a histogram of the receive physical layer device using the signal that represents the square of the slicer error signal;

wherein the apparatus is configured to calculate the real-time signal-to-noise ratio by dividing two hundred eighty eight by the calculated value of variance to produce a division result, taking a base ten logarithm of the division result to produce a logarithm result, and multiplying the logarithm result by ten.

19. A method for computing a real-time signal-to-noise ratio of data signals in a receive physical layer device, the method comprising the steps of:
generating in a slicer module a signal that represents a square of a slicer error signal;
calculating in a variance computation unit a value of a variance of a histogram of the receive physical layer device using the signal that represents the square of the slicer error signal; and
calculating the real-time signal-to-noise ratio using the calculated value of variance;
wherein calculating the value of variance comprises:
generating first and second outputs at a variance timer logic unit, the first output comprising an indication that calculation of the value of variance is active, the second output resetting an accumulation register in the variance computation unit; and
for each of a plurality of values of the square of the slicer error signal:
adding the value of the square of the slicer error signal to a value output by the accumulation register to produce a sum;
performing a logical AND operation involving the sum and the first output of the variance timer logic unit to produce a result; and
storing the result in the accumulation register.

20. The method as set forth in claim 19, wherein the step of calculating the value of variance comprises the step of continuously accumulating the plurality of values of the square of the slicer error signal for a selected period of time.

* * * * *